US006622245B1

(12) United States Patent
Nelson

(10) Patent No.: US 6,622,245 B1
(45) Date of Patent: Sep. 16, 2003

(54) FIRMWARE FIELD PROGRAMMING INTERFACE AND MODULE FOR PROGRAMMING NON-VOLATILE MEMORY ON A CIRCUIT BOARD WHILE ISOLATING THE PROCESSOR FROM POWER USING EXPANSION BUS CONTROLLER

(75) Inventor: Albert Rudy Nelson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,518

(22) Filed: Mar. 30, 2000

(51) Int. Cl.[7] .................................................. G06F 9/24
(52) U.S. Cl. ............................. 713/2; 713/300; 710/10; 710/306
(58) Field of Search ...................... 713/300, 2; 365/226; 439/500; 455/127; 710/10, 306

(56) References Cited

U.S. PATENT DOCUMENTS

| | | | | |
|---|---|---|---|---|
| 4,771,399 A | * | 9/1988 | Snowden et al. ............ 365/226 |
| 5,320,561 A | * | 6/1994 | Cook et al. .................. 439/500 |
| 5,564,108 A | * | 10/1996 | Hunsaker et al. ............. 702/65 |
| 5,590,373 A | * | 12/1996 | Whitley et al. ................ 710/8 |
| 5,652,886 A | * | 7/1997 | Tulpule et al. ................ 713/2 |
| 5,729,683 A | * | 3/1998 | Le et al. ..................... 709/237 |
| 5,751,163 A | * | 5/1998 | Tang et al. .................... 326/38 |
| 5,927,050 A | * | 7/1999 | Houck et al. ................. 53/428 |
| 6,003,103 A | * | 12/1999 | Klein ........................ 710/306 |
| 6,021,447 A | * | 2/2000 | Szeto et al. .................... 710/8 |

FOREIGN PATENT DOCUMENTS

| | | | | |
|---|---|---|---|---|
| JP | 2002049446 A | * | 2/2002 | ............ G06F/3/00 |
| JP | 2002278783 A | * | 9/2002 | ........... G06F/11/00 |

OTHER PUBLICATIONS

Altera ,"In–System Programmability in MAX Devices", Application Note 95 ver. 1.03, Jun. 2000.*
Altera , "ByteBlaster Parallel Port Download Cable", Data Sheet ver 2.01, Feb. 1998.*
Altera , "Introduction to ISP", ver. 3, Feb. 1998.*
Xilinx, "ISP Standards & Specifications", [downloaded from www.xilinx.com/isp/isp.htm on Apr. 23, 2003].*
Brian Sterns, National Semiconductor, "Partitioning extends utility of JTAG scan chains", [downloaded from www.planetanalog.com/story/OEG20030205S0050], Feb. 5, 2003.*

\* cited by examiner

*Primary Examiner*—Thomas Lee
*Assistant Examiner*—Albert Wang
(74) *Attorney, Agent, or Firm*—Paul E. Steiner

(57) ABSTRACT

A method and apparatus for programming firmware on a circuit board without powering the entire circuit board includes a firmware interface which can be isolated from the rest of the circuit board and a logic module for programming the firmware. The firmware interface includes a connector which supports powering the circuit board as well as permitting programming from the logic module.

19 Claims, 6 Drawing Sheets

FIRMWARE FIELD PROGRAMMING INTERFACE AND MODULE FOR PROGRAMMING NON-VOLATILE MEMORY ON A CIRCUIT BOARD WHILE ISOLATING THE PROCESSOR FROM POWER USING EXPANSION BUS CONTROLLER

FIELD OF THE INVENTION

Embodiments of the present invention provide a method and apparatus for firmware programming on a circuit board. More particularly, embodiments of the present invention provide methods and apparatus for firmware programming on a circuit board via a firmware field programming interface.

BACKGROUND OF THE INVENTION

General purpose computers and other processing devices (hereinafter "computing devices") utilize a wide variety of computer programs to perform various tasks. A computer program includes a series of instructions or statements arranged in a specific sequence and written in a language executable by the processor of the computing device to achieve a certain result. Such programs include, to name just a few types, operating systems, compilers and applications.

Computer programs may be implemented in either software or firmware, each of which is executed by the hardware of the computing device. Software, as used herein, refers to those computer programs whose instructions and/or data are stored and maintained in the computing device only for so long as power continues to be supplied thereto. Such computer programs are typically semi-permanently stored on magnetic disc and downloaded for volatile storage in a random access memory (RAM) when needed by the computing device. Programming stored in this fashion must be reloaded into the RAM of the computing device each time there is a power interruption.

Firmware, on the other hand, as used herein, refers to those computer programs whose instructions and/or data are stored and maintained permanently in the computing device without the need for the continued application of power. One such computer program is the basic input/output system (BIOS). These computer programs, like the BIOS are typically stored in non-volatile read only memory (ROM), programmable read only memory (PROM) or erasable programmable read only memory (EPROM). Use of a non-volatile memory obviates the need to reload the programming into the computing device in the event of a power loss or turn-off.

Unlike software, which is relatively easily corrected or updated (for example, by means of modifying or replacing the magnetic media upon which the software is stored), once firmware is stored in the fixed ROM of the computing device it cannot be written over without removing the integrated circuit chip in which the firmware is stored or replacing the circuit board. Thus, in order to correct programming errors or install programming updates issued after the computing device is placed into general public use, the computing device itself must be returned to or serviced by a representative of the manufacturer. The replacement of the integrated circuit chip or circuit board is, however, inconvenient, expensive and time consuming. Considerable effort has accordingly been expended in discovering ways to correct and update device firmware without the need for chip replacement or hand-on access by the manufacturer to the computing device.

The development of electrically erasable programmable read only memory (EEPROM) has obviated to some extent the need for replacing memory chips storing firmware when programming corrections or upgrades are required. The EEPROM includes a read only memory device whose individual data storage locations (addresses) are erasable and reprogrammable by applying certain electrical signals to the chip. New firmware can thus be stored in the chip without removing the chip from the computing device. Unfortunately, in order to reprogram the BIOS, the motherboard must be powered on. This is a costly and inefficient way to update the BIOS.

In view of the foregoing, it can be appreciated that a substantial need exists for a method and apparatus for correcting or updating firmware without having the computer system powered or without opening the computer chassis.

BRIEF DESCRIPTION OF THE DRAWINGS

The features and advantages of the present invention will become apparent from the following detailed description in combination with the figures listed below.

DETAILED DESCRIPTION

Embodiments of methods and systems for programming firmware on a circuit board without powering the entire circuit board includes a firmware interface which can be isolated from the rest of the circuit board and a logic module for programming the firmware. The firmware interface includes a connector which supports powering the circuit board as well as permitting programming from said logic module.

In the following description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciated that the specific sequence in which methods are presented and performed are illustrative and it is contemplated that the sequences can be varied and still remain within the spirit and scope of the present invention.

Figure 1:
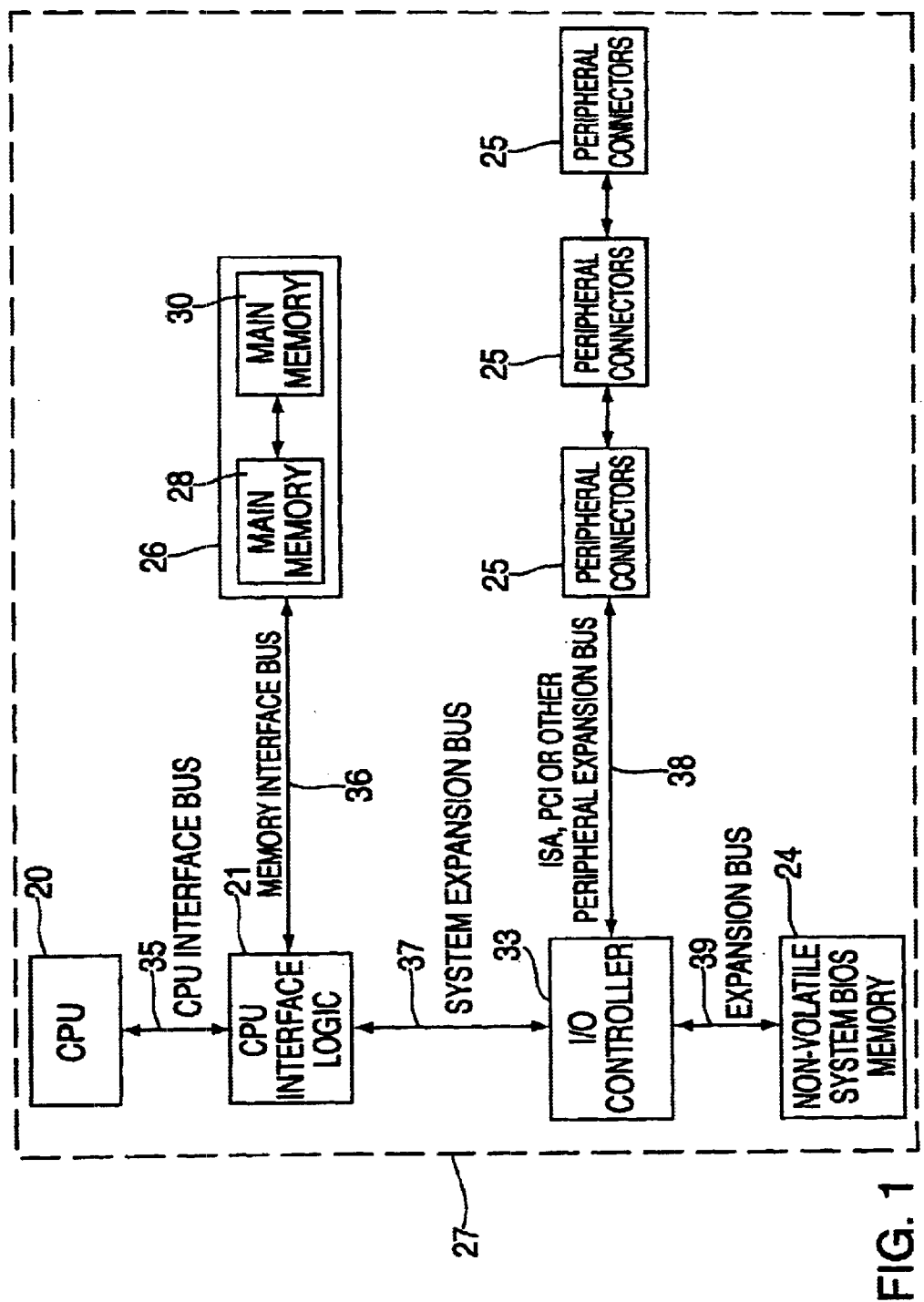
FIG. 1 is a simplified overview of a typical architecture of a computer system.

FIG. 1 shows a simplified overview of a typical architecture of a computer system's motherboard. Typically, motherboard 27, includes a processor such as a central processing unit or CPU 20. The CPU is the "brains" or "engine" of the computer system responsible for overseeing all execution of operations in the computer. Motherboard 27 also includes CPU interface logic 21, coupled to CPU 20 and interfacing CPU 20 with other circuit components such as bus and input/output (I/O) controller 33 and main memory 26. As shown, I/O controller 33 maybe any type of expansion bus controller such as a PCI bus or peripheral bus I/O controller. I/O controller 33 is coupled to CPU interface logic 21 and is coupled to peripheral connectors 25 via expansion bus 38. A bus that complies with a Peripheral Component Interconnect (PCI) standard (e.g., PCI Local Bus Specification, version 2.1, a copy of which may be obtained from the PCI Special Interest Group) is a example of such an expansion bus. Main memory 26 may include random access memory (RAM) 28 and read only memory (ROM) 30 which is coupled to CPU interface logic 21.

Motherboard 27 further includes a Basic Input Output System (BIOS) firmware module 24. The BIOS firmware module includes a collection of software routines and functions that communicate directly with the hardware of motherboard 27. The hardware components communicate along data pathway or busses 35, 36, 37, 38 and 39 which is included on motherboard 27 which houses the CPU 20, main memory 26, and other components including BIOS firmware chip 24 and bus and I/O controller 33. Several types of busses shown in FIG. 1 may include for example, CPU Interface Busses, Memory Interface Busses, System Expansion Busses and Industry Standard Architecture (ISA) Buses.

Figure 2:
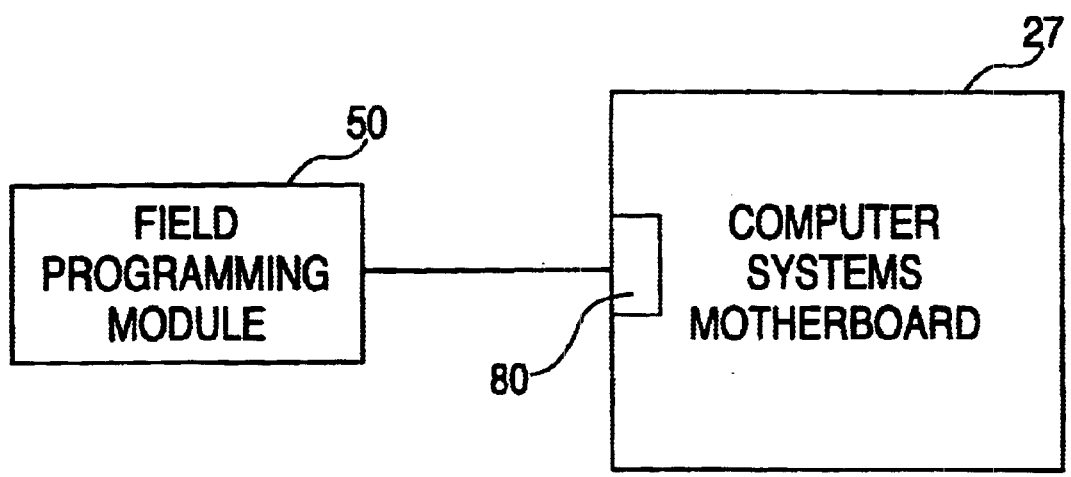
FIG. 2 is a simplified block diagram, showing a relationship between a field programming module of the present invention and the computer system architecture of FIG. 1.

Referring to FIG. 2, a special, external logic module such as a field programming module 50, for performing the processes according to an embodiment of the present invention, described below with reference to FIG. 5, operates with the components shown in FIG. 1 and in particular with the BIOS firmware 24 to reprogram the firmware when a computer system 10 is not powered on. According to one embodiment of the present invention, the field programming module 50 includes a plurality of electronic circuits and components packages together on a electronic card or module and is coupled to computer system 10 through a mating connectors 80 and 82. In an alternative embodiment of the present invention, a manufacture can reprogram the BIOS of motherboard 27 before the motherboard is placed in computer system 10.

Figure 3:
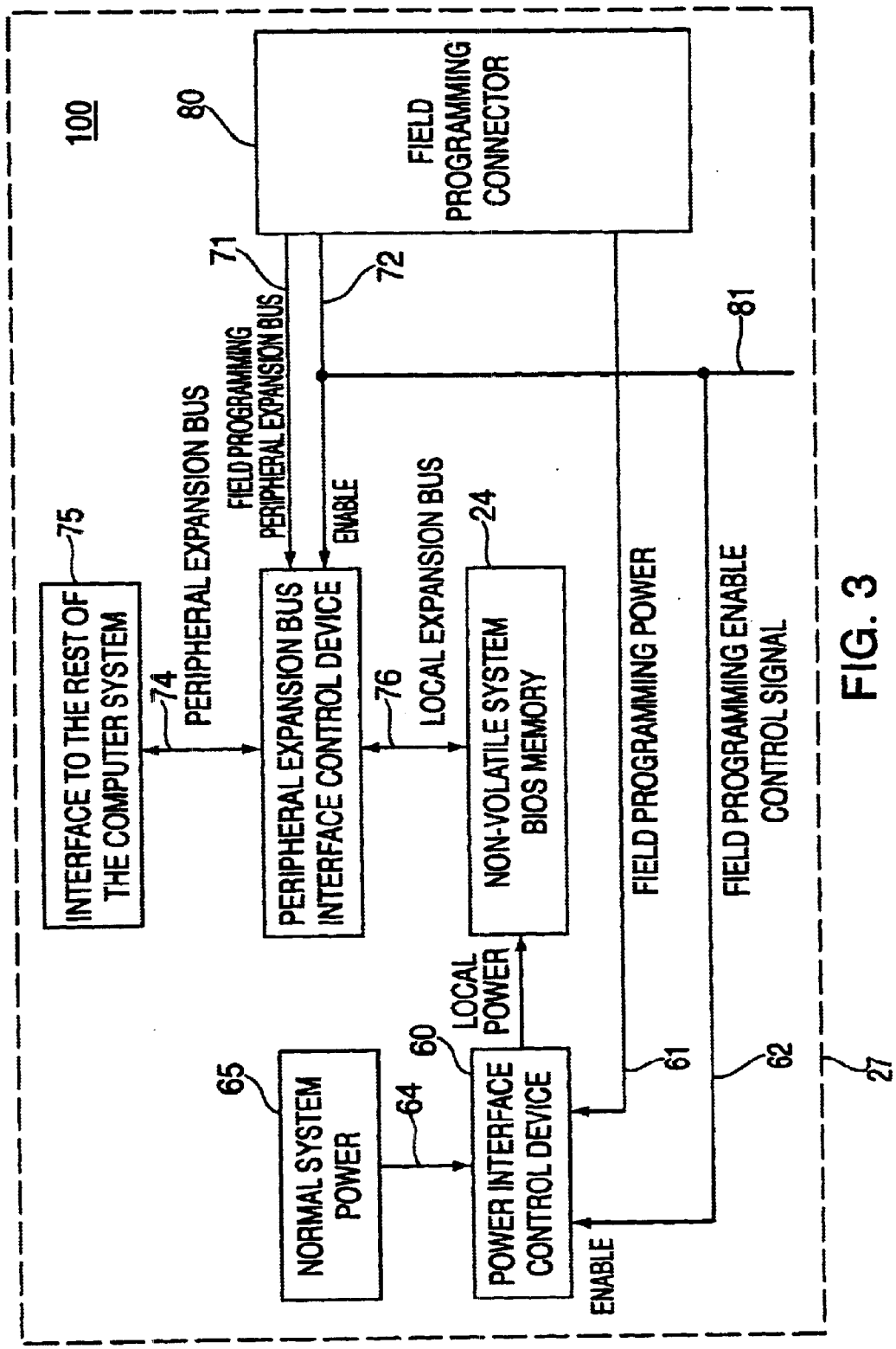
FIG. 3 is a block diagram of an embodiment of a firmware field programming interface implemented in the computer system of FIG. 1.

FIG. 3 is a block diagram of an embodiment of a firmware field programming interface implemented in the computer system of FIG. 1. Firmware field programming interface 100 includes a power interface control device 60 and a peripheral expansion bus interface control device 70 coupled to BIOS firmware module 24. Firmware field programming interface 100 also includes a field programming connector 80 which is coupled to peripheral expansion bus interface control device 70 via a field programming peripheral expansion bus 71 and to power interface control device 60 via field programming power line 61.

According to an embodiment of the present invention, firmware field programming interface 100 is used to isolate BIOS firmware module 24 from the remainder of the circuit components shown in FIG. 1. As shown, power interface control device receives inputs from normal system power (e.g., from a power supply via traces on the motherboard 27), represented by block 65, and from field programming connector 80. Likewise, peripheral expansion bus interface control device 70 communicates with the rest the computer system components via bus 74 and with the field programming connector 80 via field programming peripheral expansion bus 71 when field programming module 50 is connected and supplies power and data.

When motherboard 27 is one of many motherboards stocked in inventory before being shipped to customers, the BIOS can be reprogrammed (e.g., updated, slightly modified, changed completely) before being shipped to customers and without the motherboard being powered. According to an embodiment of the prevention, field programming module 50 is plugged into field connector programming connector 80 via a mating device and supplies power via a local power source on firmware field programming module 50 and data to BIOS firmware module 24. Power interface control device 60 receives power from field programming connector 80 and outputs local power to BIOS firmware module 24. Also, peripheral expansion bus interface control device 70 receives data from field programming connector 80 and output this data via a local expansion bus 76 to BIOS firmware module 24. As used herein, data refers to control, address and data signals sent across the buses. Firmware field programming interface 100 also includes a pull down resistor 81 which keeps power interface control device and peripheral expansion bus control device in a normal state (e.g., receiving inputs from the normal system power and communicating with the rest of the computer system) unless the logic module is plugged into field programming connector 80.

Figure 4:
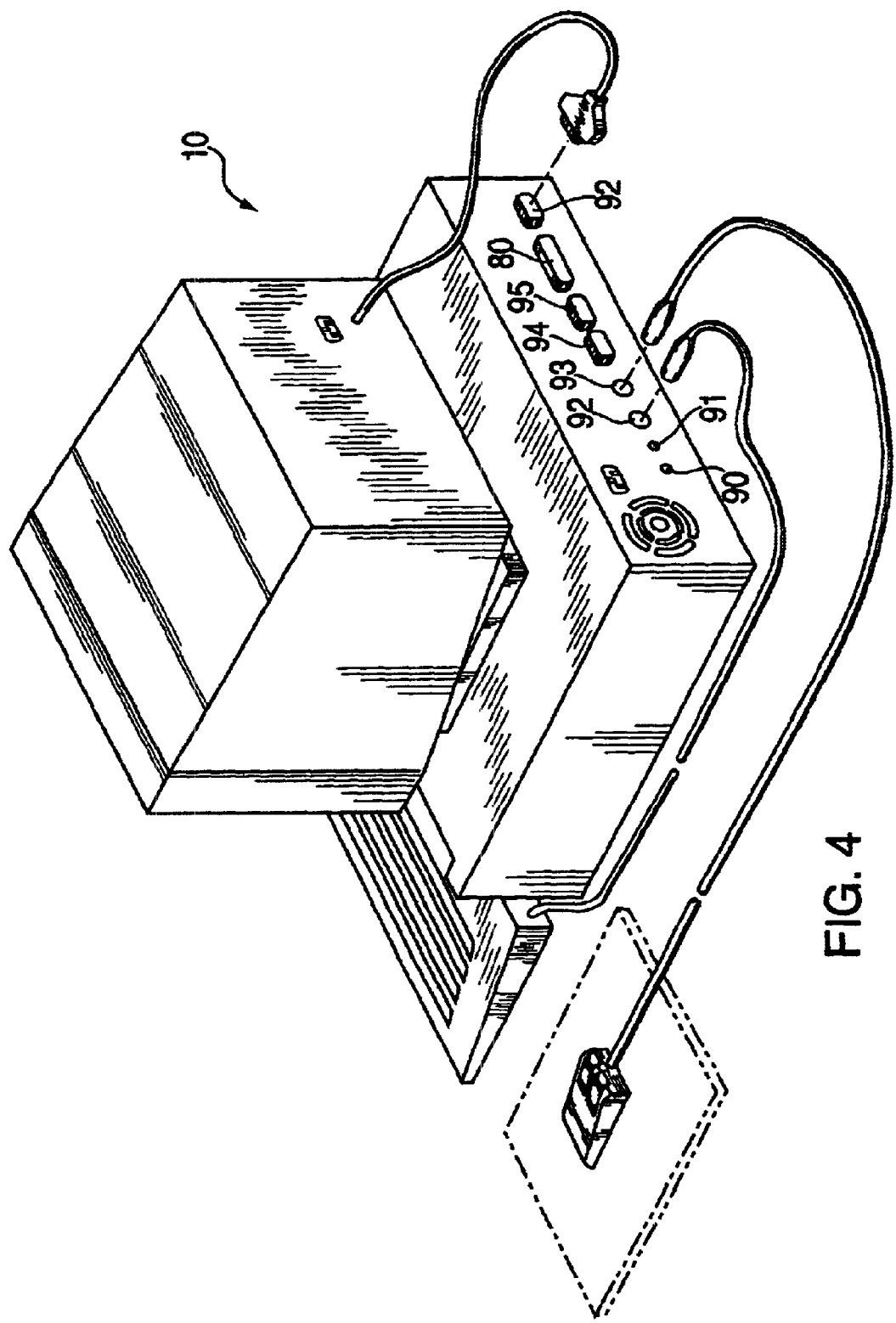
FIG. 4 is a perspective view of a backside of the computer system with a field programming connector coupled to a motherboard adapted to receive a field programing module.

Field programming connector 80 is positioned on motherboard 27 such that it protrudes from the back chassis of a computer system 10 when motherboard 27 is placed in computer system 10. As shown in FIG. 4, field programming connector 80 as well as connectors 90–96 are may accessible to a user without removing the computer chassis. According to an embodiment of the present invention, field programming module 50 can be used external to computer system 10 for reprogramming the BIOS firmware module 24.

Figure 5:
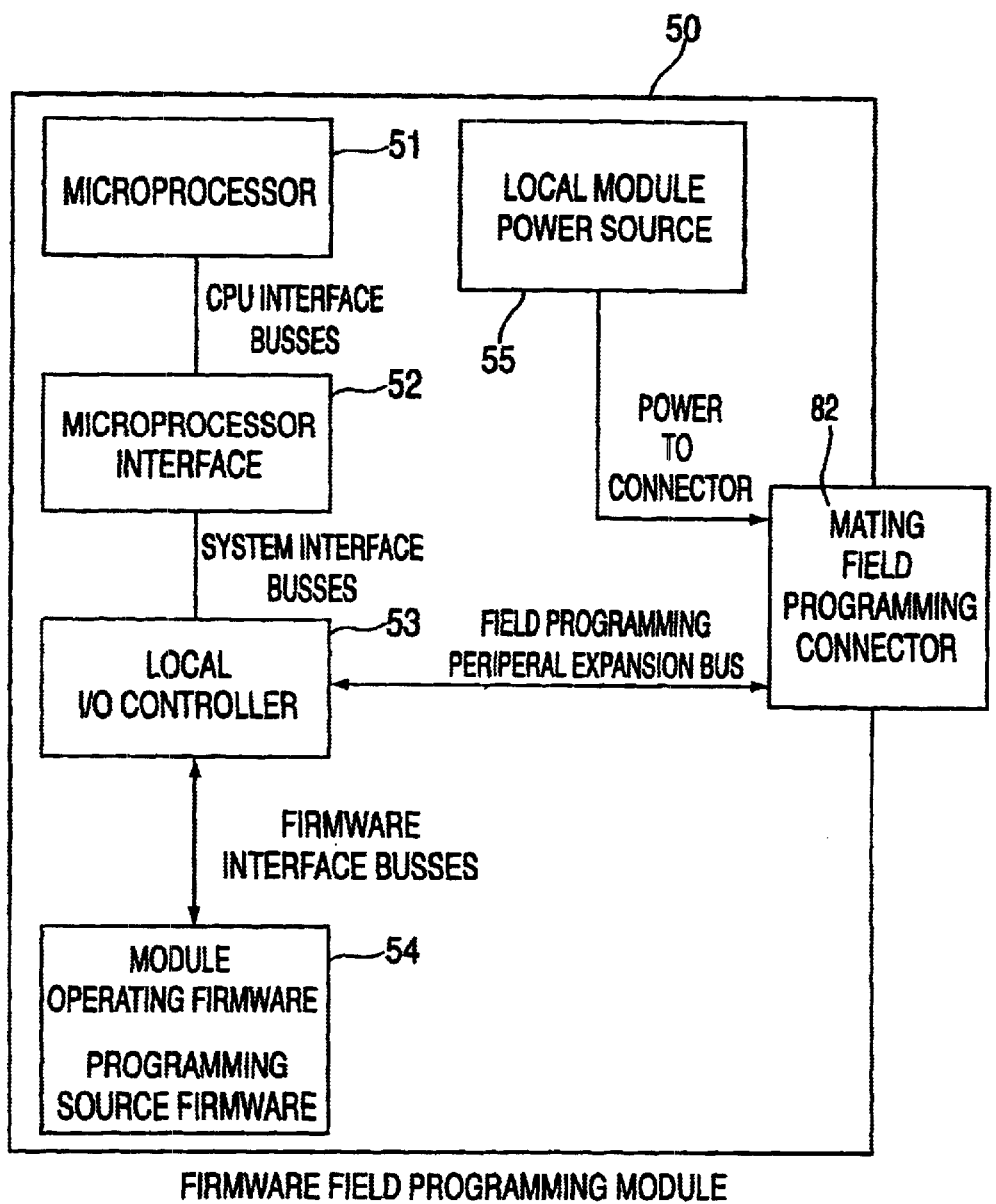
FIG. 5 is a block diagram of the field programming module according to an embodiment of the present invention.

FIG. 5 is a block diagram of the field programming module 50 shown in FIG. 2. Field programming module may be implemented as an external card including a microprocessor 51, microprocessor interface logic 52, I/O controller interface 53, programming firmware module 54 and local module power source 55. Local module power source 55 supplies power to field programming module 50 once the programming module has been plugged in or turned on. In addition, local module power source 55 also supplies power to mother board 27 via mating field programming connector 82 which mates with field programming connector 80 on mother board 27.

Programming firmware module 54, coupled to local I/O controller 53 and mating field programming connector 82, includes module operating firmware and programming source firmware. Module operating firmware includes a collection of software routines and functions that communicate directly with the hardware of field programming module 50 while programming source firmware includes a collection of software routines and functions used to reprogram or modify BIOS firmware module 24.

Figure 6:
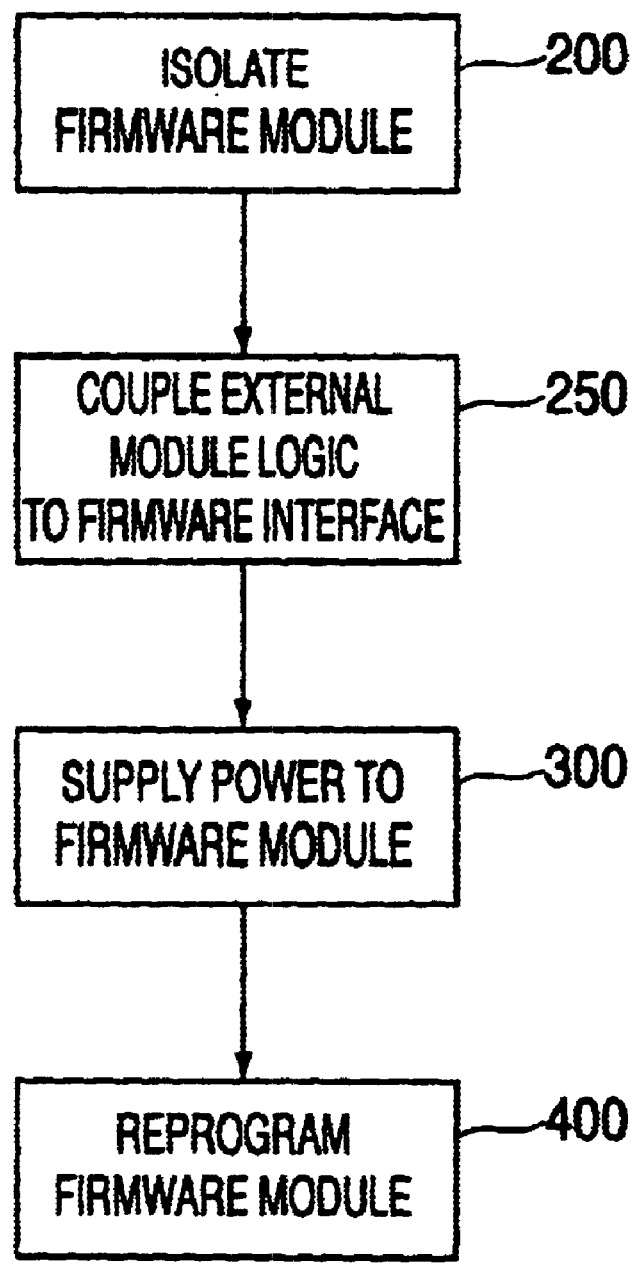
FIG. 6 is a flow diagram illustrating a method for programming firmware on a circuit board without powering the entire circuit that may be implemented in accordance with an embodiment of the present invention.

Referring now to FIG. 6, in accordance with an embodiment of the present invention, a method is provided for programming firmware on a circuit board without powering the entire circuit board. In this particular embodiment, the firmware module is isolated from the rest of the circuit board via a firmware programming interface(Step 200). The firmware programming interface includes a power interface control device, bus interface control device and field programming connector to the motherboard 27. An external logic module is coupled to the firmware programming interface (Step 250). The external logic module is coupled to the firmware programming interface via its mating field programming connector such that power is supplied from the local module power source to the power interface control device (Step 300) and data is supplied from the firmware module to the bus interface (Step 350).

In the foregoing, detailed descriptions of the apparatus accordance with embodiments of the present invention have been described with reference to specific exemplary embodiments. Accordingly, the present specification and figures are to be regarded as illustrative rather than restrictive. Moreover, although software or hardware are described to control the certain functions, such functions may be performed using either software, hardware, or a combination of software and hardware, as is well know in the art.

What is claimed is:

1. A field programming interface for a computer circuit board including a programmable nonvolatile memory and a processor, comprising:
    a field programming connector;
    a power interface coupled to said field programming connector for receiving power from an external source, wherein the power interface is adapted to selectively provide power to the programmable non-volatile memory without providing power to other components on the computer circuit board, the non-powered components including the processor; and
    a bus interface coupled to said field programming connector to supply data to said programmable non-volatile memory.

2. The field programming interface according to claim 1, where said programmable non-volatile memory stores a basic input and output system (BIOS).

3. The field programming interface according to claim 1, wherein said programmable non-volatile memory stores firmware.

4. The field programming interface according to claim 1, wherein said power interface receives power from an external logic module.

5. The field programming interface according to claim 1, wherein said bus interface receives data from an external logic module.

6. The field programming interface according to claim 1, wherein said connector is mounted to a back chassis of a computer system and protrudes therefrom.

7. A firmware programming apparatus for programming a non-volatile memory on a circuit board including a processor without powering the entire circuit board comprising:
    a firmware interface isolating said non-volatile memory from other components on the circuit board, said firmware interface including a programming connector which supports powering the non-volatile memory on the circuit board without powering other components on the circuit board, the non-powered components including the processor, as well as permitting programming from a logic module.

8. The firmware programming apparatus according to claim 7 further including a power interface coupled to said programming connector for supplying power to said non-volatile memory.

9. The firmware programming apparatus according to claim 7 further including a bus interface couple to said programming connector for programming said non-volatile memory.

10. The firmware programming apparatus according to claim 7, wherein said non-volatile memory stores a basic input and output system (BIOS).

11. A logic module operating in combination with a programming field interface for programming a firmware module on a circuit board without powering the entire circuit board comprising:
    a local firmware module having stored therein programming data for programming said firmware module, said local firmware module coupled to said programming field interface; and
    a power module coupled to said programming field interface and providing power to said firmware module without providing power to other components on the circuit board, the non-powered components including a processor on the circuit board.

12. The logic module according to claim 11, further comprising a mating field programming connector being coupled to said programming field interface.

13. The logic module according to claim 11, wherein said local firmware module includes module operating firmware and programming source firmware.

14. The logic module according to claim 11, wherein said local firmware module includes programming source firmware.

15. A method for programming a firmware module on circuit board without powering the entire circuit board, the circuit board including a firmware module and a processor, the method comprising:
    isolating said circuit board's firmware module from other components on the circuit board;
    powering said firmware module from an external source without powering other components on the circuit board, the non-powered components including the processor; and
    programming said firmware module.

16. The method for programming a firmware module on circuit board without powering the entire circuit board according to claim 15 further comprising coupling an external logic module to said firmware programming interfacing.

17. The method for programming a firmware module on circuit board without powering the entire circuit board according to claim 16, further comprising programming said firmware with said external logic module.

18. The method for programming a firmware module on circuit board without powering the entire circuit board according to claim 16, wherein said firmware module is powered by a local module power source on said external logic module.

19. The method for programming a firmware module on circuit board without powering the entire circuit board according to claim 16, wherein said firmware module is programmed using programming source firmware.

* * * * *